Figure 1:
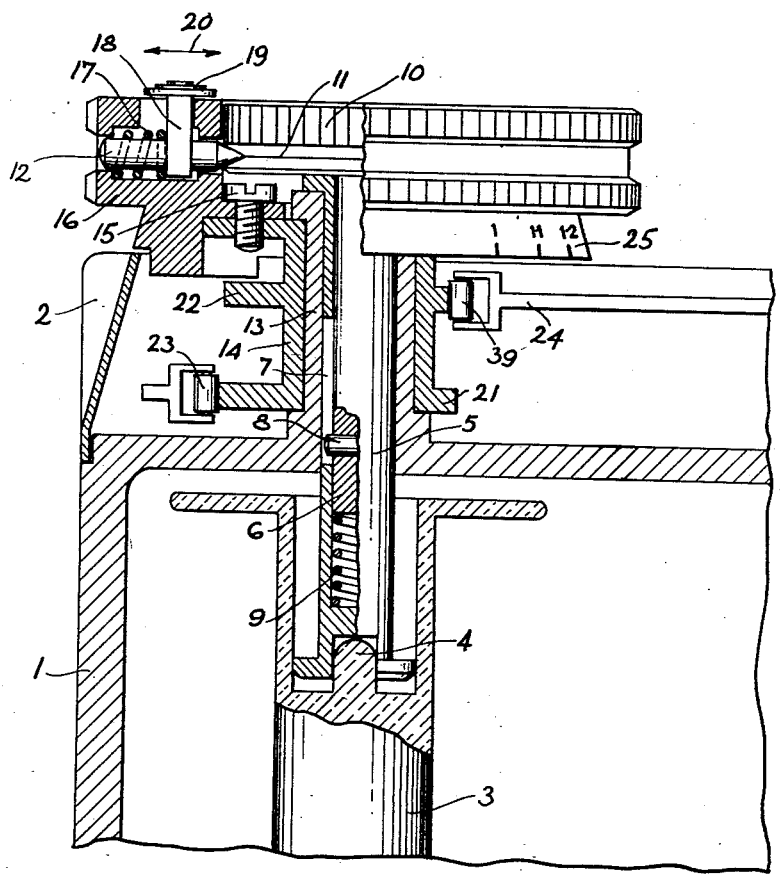

March 29, 1955

F. W. MISCHE 2,704,969

ROLL-FILM CAMERA WITH CO-AXIAL FILM
WINDING AND FOCUSING KNOBS

Filed Aug. 22, 1951

3 Sheets-Sheet 1

INVENTOR.
FRIEDRICH WILHELM MISCHE

BY Mock & Blum

ATTORNEYS

INVENTOR.
FRIEDRICH WILHELM MISCHE
BY Mock & Blum
ATTORNEYS

March 29, 1955

F. W. MISCHE 2,704,969

ROLL-FILM CAMERA WITH CO-AXIAL FILM WINDING AND FOCUSING KNOBS

Filed Aug. 22, 1951

3 Sheets-Sheet 3

INVENTOR.
FRIEDRICH WILHELM MISCHE
BY Mock & Blum
ATTORNEYS

United States Patent Office 2,704,969
Patented Mar. 29, 1955

2,704,969

ROLL-FILM CAMERA WITH CO-AXIAL FILM WINDING AND FOCUSING KNOBS

Friedrich Wilhelm Mische, Braunschweig-Gliesmarode, Germany, assignor to Voigtlander & Sohn Aktiengesellschaft, Braunschweig, Germany, a corporation of Germany Application August 22, 1951, Serial No. 243,123

Claims priority, application Switzerland August 23, 1950

11 Claims. (Cl. 95—31)

This invention relates to roll-film cameras and it has particular relation to roll-film cameras, in which adjustment of the objective is brought about by means of an actuating element, e. g. a rotatable knob, arranged on the camera body.

It is one object of the present invention to provide in roll-film cameras actuating elements of a design and construction which facilitate their arrangement within a relatively small space available in cameras, particularly in miniature cameras.

Another object of my invention is to provide an actuating system, in which the actuating organ for the film and the actuating element for adjustment of the objective, and, if desired, also the means for adjusting the range-finder, form a structural unit and can be operated from a single point of the camera.

A further object of my invention consists in facilitating operation of the camera by improved arrangement of the actuating means for the film and the actuating element for adjustment of the objective.

Such easier operation is of advantage particularly in cases, in which the camera during adjustment, and if desired also during taking pictures, is held for example at eye-level in a position, in which the object is viewed through the view-finder. It facilitates operation if it is not necessary to look for the actuating elements and if the means for winding of the film as well as the means for adjusting the range-finder can be easily found and handled. This advantage is present also in cameras in which the operator has to look from above into a view-finder shaft.

In carrying out my invention, various arrangements can be used. The above mentioned structural unit for adjusting the film and the objective, can be arranged on the upper surface or on a lateral surface of the camera. According to my invention, the actuating means for the film and the actuating member for adjustment of the objective and of the range-finder should be arranged with their axes in parallel position. According to a preferred embodiment, both actuating groups have a common axis. If the actuating organs are arranged on the upper narrow side of the camera, their axes transmitting the adjustment, are parallel with the axis of a film spool, or—according to a particularly advantageous, preferred embodiment—their axes coincide with the axis of said spool, which is preferably the axis for winding back the film.

In the above described system, the two actuating members to be operated by hand, can be arranged one upon another. However, they can be also arranged by sinking one of them in the other. The actuating means for the film spool can enclose the other actuating element for adjusting the objective or the range-finder, or the actuating means for the film can be enclosed by said other actuating element.

According to an embodiment of my invention, in the structural unit of the control and adjusting elements, one of the elements can be axially displaced relative to the other. In the above mentioned arrangement, in which one element is sunk in the other, I prefer to provide for a coaction of the element capable of being sunk, with holding means which secures said element in its sunk position, and is capable of releasing it from said secured position. Such release from the locked position can be brought about, for example, by means of a manually operated handle, e. g. an adjustable knob. A spring can be arranged which causes advance of the sunk element, upon its release. In this step either one of the actuating knobs can be caused to advance or a tongue or bow is shifted to an elevated position. The protruding organ can be used for bringing about the desired turning movement. The last mentioned modification including the tongue or bow is particularly advantageous in winding the film, especially if it is used for actuating the means for winding back the film.

The axis for winding the film spool preferably consists of a hollow shaft, which houses a second shaft. This second shaft is caused by spring effect to advance and bring about telescopic lengthening of the shaft, upon release of the above mentioned holding means for securing the rest position.

According to an embodiment of my invention, the structural unit including the before-mentioned two actuating elements, comprises a sleeve or hollow shaft arranged in the camera body. Said shaft encircles the axis which is in engagement with the film spool and connected with the actuating member of the latter. Said sleeve or hollow shaft is in connection with the actuating means for adjustment of the objective and/or range-finder and it carries the transmission members for the adjustment gears.

Figure 2:
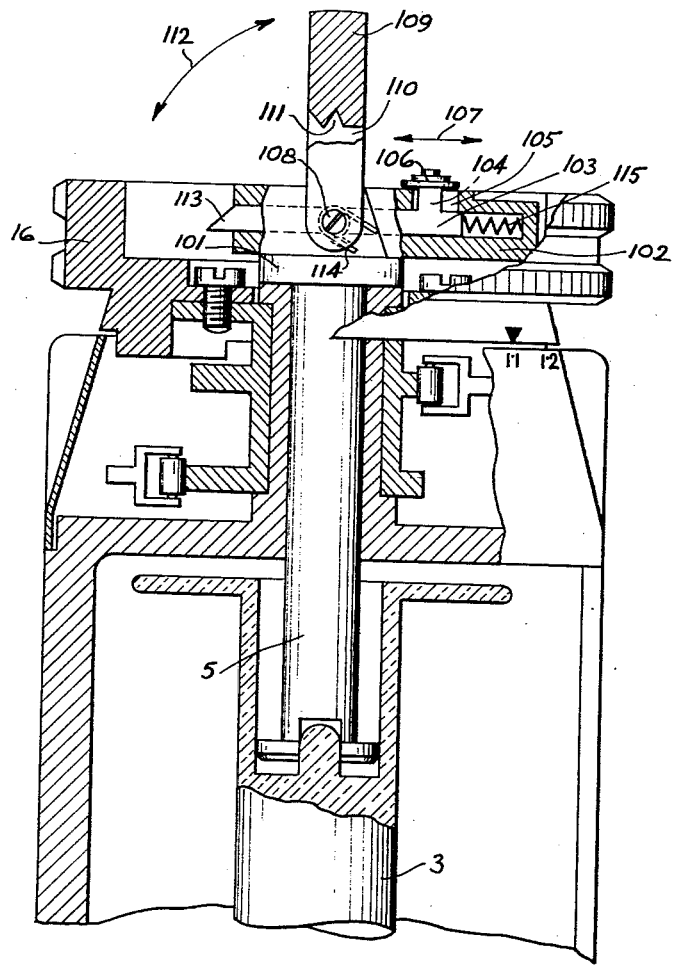
Figure 3:
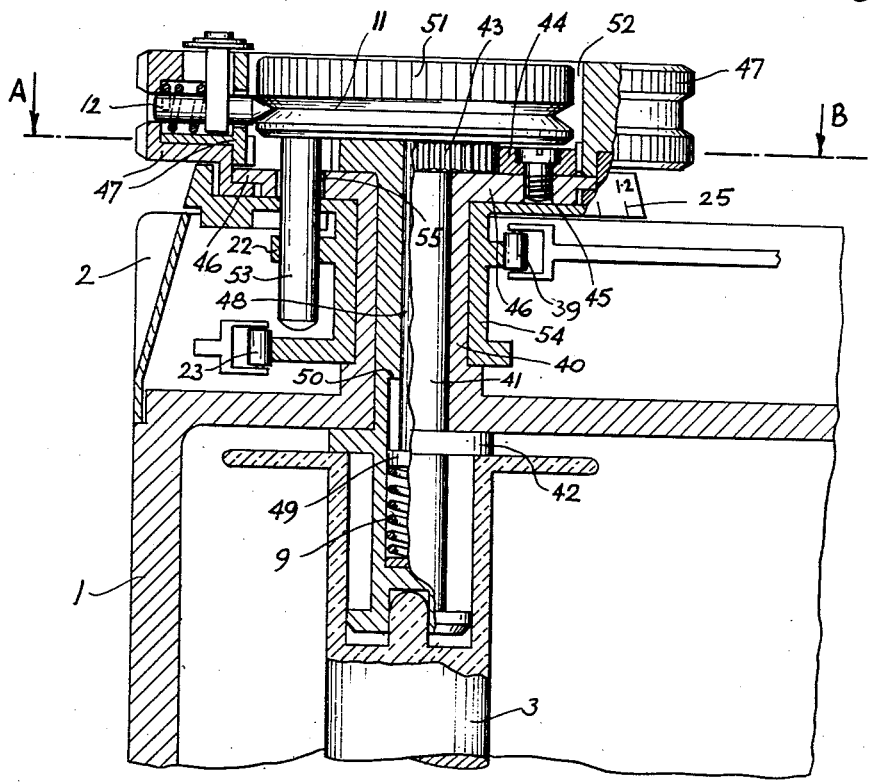
Figure 4:
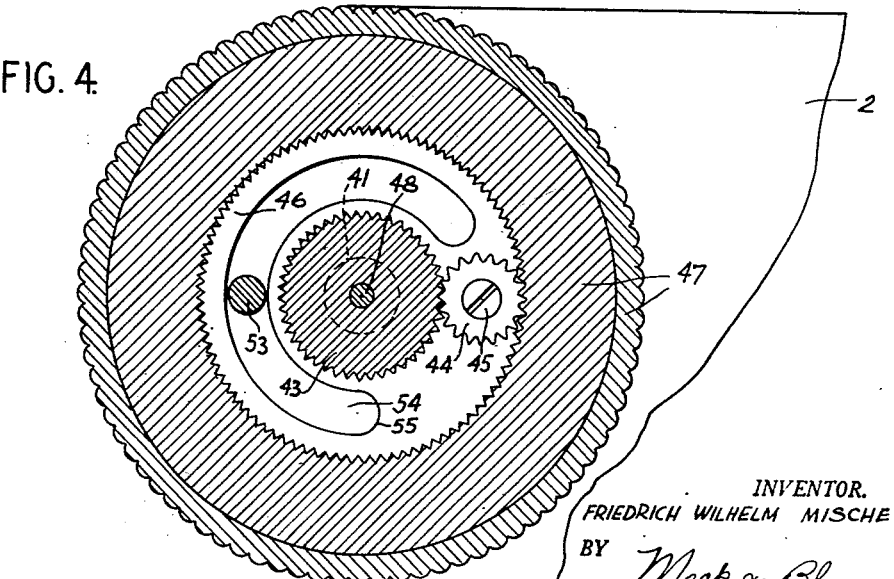

The appended drawings illustrate, by way of example, some embodiments of the invention, to which the invention is not limited. Figure 1 is the sectional view of a structural unit comprising the actuating member for the film and the actuating organ for adjustment of the objective and/or the range-finder. Figure 2 diagrammatically illustrates another embodiment of the invention. Figures 3 and 4 illustrate a further embodiment of the invention, in which the actuating or adjusting member for the objective and/or the range-finder is capable of being sunk in the actuating member for the film spool, Figure 4 being a section along line A—B of Figure 3.

In the embodiment shown in Figure 1, the structural unit is arranged on the narrow upper side of the camera and is shown in this position partly in section. The actuating members have a common axis, which coincides with the axis for winding back the film. In Figure 1, the actuating member for the film is arranged in sunk position within the surrounding actuating member for adjustment of the objective and range-finder. In order to cause winding of the film, the actuating organ is caused to advance upward from its countersunk position.

The section shown in Figure 2 is taken in the same direction as in Figure 1, but in an angle of 90° with the plane of section in Figure 1. In this embodiment, the countersunk actuating organ remains in its position and is not axially displaceable. In order to use this organ, a tongue or bow is swung to an erected position, said tongue being shown in Figure 2, in said erected position. In this case too, the actuating member for displacing the objective and adjusting the range-finder, surrounds the member for actuating the film.

In Figure 1, reference numeral 1 denotes the camera body, which is only partially shown in Figure 1. The camera body proper is provided, in a conventional manner, with a so-called top plate 2, which houses actuating, switching, counting and like elements. 3 denotes a film spool, preferably the spool for winding back the film. It is coupled, in conventional manner, with the actuating member of the film winding device, as indicated at 4. This is done by providing a stationary hollow shaft 5, in which another shaft 6 can be slidably displaced. Axial displacement of the latter is limited by slot 7 of hollow shaft 5 and by pin 8 of displaceable shaft 6. Spring 9 constantly tends to press displaceable shaft 6 outward. Displaceable shaft 6 carries at its upper end, a rotatable knob 10. The latter is provided with a peripheral groove 11, which is engaged by outer bolt 12. Knob 10 cannot be advanced to the actuating position, unless bolt 12 is withdrawn. The release step will be described further below. Shaft 5 is encompassed by the stationary and undisplaceable sleeve 13. This guide sleeve may form an integral part of camera body 1, as shown in Figure 1. A second sleeve or bushing 14 is arranged rotatably but in axially not displaceable manner on sleeve 13.

This second sleeve is firmly connected by means of a screw 15 or the like with rotatable knob 16, which serves for actuation of adjusting means for the objective and the rangefinder. Knob 16 is hollowed out, so that rotary knob 10 of the film transport can be sunk in knob 16. The before mentioned bolt 12, which is housed by knob 16, is constantly held in engagement with the rotary knob of the film transport, by means of spring 17. Pin 18 is firmly connected with bolt 12. The upper end of pin 18, which projects beyond the outer surface of adjusting knob 16, is provided with a knob-like grip 19. Arrow 20 indicates that pin 18, together with bolt 12, can be displaced to the left, against the effect of spring 17, so that film control knob 10 is released.

In the embodiment shown, two cams 21 and 22 are fastened to rotatable sleeve 14, and, preferably, they form integral parts of sleeve 14. In the embodiment illustrated in Figure 1, the lower cam 21 serves for actuation of the objective extension, and a lever arrangement, not shown in detail bears elastically against the same; this is indicated by roll 23 in Figure 1. This lever arrangement leads to the objective board in conventional manner. A lever merely indicated at 24 bears against the second cam 22, by means of roll 39, and this lever brings about adjustment of the rangefinder, for example swinging of the mirror, by the usual transmission means. Upon turning adjusting knob 16, sleeve 14 is also turned so that different sections of cams 21, 22 come in contact with transmitting elements 23, 24 and 39. In the embodiment according to Figure 1, upper cam 22 for adjusting the rangefinder, has an equal pitch per angle unit, i. e. it is designed as an Archimedean spiral. In the design of the lower cam 21, a steadily increasing pitch, or otherwise increasing change, is present per angle unit. This curve can be denoted as a hyperbolic spiral. Such arrangement has the advantage that it is not necessary to adjust the two cams relative to each other. Therefore, turning of the adjusting knob results simultaneously in correct adjustment of the rangefinder as well as in the exact objective extension. An adjusting device is, of course, provided for the assemblage. These details are not necessary for understanding the present invention, and they are, therefore, omitted in the drawing. At the bottom of the adjusting knob, the scale of distances is indicated at 25.

It will be understood that the above described structural unit represents not merely a structurally compact design, but also provides for the independent and mutually unaffected operation of the two elements, i. e. the film spool as well as the adjustment of the rangefinder and objective.

In Figure 2, identical reference numerals have been used for denoting elements which are identical with elements shown in Figure 1. As shown in Figure 2, in the illustrated embodiment shaft 5 houses no other shaft and the rotary knob for actuating means for winding the film cannot be advanced to a protruding position in this embodiment. Therefore, a solid shaft 5 is used. The latter is provided at its outer end with a collar 101, which is connected with rotary knob 102. This knob 102 is sunk in rotary knob 16 of the means for adjusting the objective and the range-finder. Rotary knob 102 has a horizontal bore and carries in said bore a displaceable bolt 103, which is connected with an upward extending pin 104 or the like, which can be displaced to a certain extent in a slot-like groove 105. Such displacement can be effected in the direction of arrow 107 by means of a knob-like grip 106 which slightly projects from the surface of knob 102. A swinging tongue- or bow-like handle 109 is connected, by means of a bolt 108, or the like, with knob 102, and said handle 109 is constantly urged by spring 114 to the position shown in Figure 2. Handle 109 is provided with a slot 110 having a recess 111. If handle 109 is turned downward in the direction of arrow 112, point 113 of locking bolt 103 enters recess 111 and keeps said handle in locked position. If, however, bolt 103 is shifted against the effect of spring 115 to the right in Figure 2, by means of knob 106, point 113 is withdrawn from recess 111 and thus releases handle 109, which then swings to the position shown in Figure 2 and can be used for actuation of means for winding the film.

In Figure 3, reference numeral 1 denotes again the camera body which is firmly connected with a sleeve 40, which forms a bearing for the axially not displaceable, hollow shaft 41, the axial position of said shaft being fixed by collar 42 and toothed wheel 43, firmly connected to shaft 41. The lower end of hollow shaft 41 is in engagement with film spool 3. Cog wheel 43 of shaft 41 meshes with pinion 44, which is rotatably fastened, by means of a screw or rivet 45, to flange-like ring 46 of sleeve 40, which is firmly connected with the camera casing. Pinion 44 is arranged to mesh also with a toothing located within rotatable knob 47 for the film transport. Thus, upon actuating knob 47, over cogs of the latter, pinion 44, cog wheel 43, and hollow shaft 41, rotating motion is transmitted to film spool 3. Another shaft 48 is journalled in hollow shaft 41, and axial displacement of this shaft is limited by its collar 49 and stop 50 of hollow shaft 41. The upper end of shaft 48 is firmly connected with rotatable knob 51 for actuation of the means for adjustment of objective and rangefinder. This rotatable knob 51 is located in a recess 52 of rotary knob 47 and is held there against the effect of spring 9 located in hollow shaft 41—like in the embodiment shown in Figure 1—by a spring bolt 12, engaging peripheral groove 11 of rotatable knob 51. Upon releasing engagement of elements 11, 12 in the manner described in connection with Figure 1, rotatable knob 51 is caused by spring 9 to advance to operative position. A pin 53 fastened to knob 51 projects without play into the bore of a socket 54, which is rotatable on stationary sleeve 40, but is axially not displaceable. When button 51 advances to operative position, said pin or bolt 53 glides upward in the beforementioned bore of socket 54, but remains in engagement with the socket even in its end position and thus transmits the rotary motion of knob 51 without play to socket 54. Thereby, said bolt 53 passes through flange-like ring 46 of sleeve 40, connected with the casing, in a kidney-shaped cut-out 55 which is long enough for allowing motion of bolt 53 for adjustment of objective and rangefinder. Firmly connected to sleeve or socket 54, are cams 21 and 22 for adjustment of the objective and rangefinder. Distance scale 25 is also fastened to socket 54 at the outermost periphery of the latter, so that it encompasses rotatable knob 47, projects beyond top plate 2, and is rotated together with and in a similar manner as knob 51. Transmission for effecting adjustment of the objective and rangefinder takes place in the manner described in connection with Figure 1, over elements 23 and 39.

It will be understood that the present invention is not limited to the specific details described above and illustrated in the drawings and can be carried out with various modifications without departing from the scope of the invention as defined in the appended claims.

The terms "actuating organ for the film," "means for actuating the film" and "member for actuating the film" are used in the present specification and claims to denote a member or organ for actuating the means for transporting, advancing or winding the film within the camera. The term "axis of a film spool" is used to include the axis for winding back the film.

What is claimed is:

1. A roll-film camera comprising in combination with a photographic objective a first cylindrical actuating member and a second cylindrical actuating member, which are rotatable about a common axis and have different diameters, said first member being connected with the driving axis of a film spool and said second member being connected with an element for adjusting the objecitve, said element being rotatable about the axis of the driving shaft of the film spool, one of said first and second members, which has a smaller diameter, being adapted to occupy a rest position and an active position, and being sunk in the other of said members in its rest position and protruding from said other member in its active position.

2. A roll-film camera comprising in combination with a photographic objective and a range-finder a first cylindrical actuating member and a second cylindrical actuating member, which are rotatable about a common axis and have different diameters, said first member being releasably coupled with the driving axis of a film spool and said second member being connected with an element for adjusting the objective and the rangefinder, said element being rotatable about the axis of the driving shaft of the film spool, one of said first and second members, which has a smaller diameter, being adapted to occupy a rest position and an active position, and being sunk in the other of said members in its rest position and protruding from said other member in its active position.

3. A roll-film camera as claimed in claim 2, in which the first actuating member forms a structural unit with the driving shaft for the film spool and is adapted to be coupled with the film spool, and has a smaller diameter than the second actuating member and the first actuating member is axially displaceable relative to said second member, and adapted to be sunk in said second member.

4. A roll-film camera as claimed in claim 2, in which the first actuating member forms a structural unit with the driving shaft for the film spool and has a smaller diameter than the second actuating member and the first actuating member is axially displaceable relative to and adapted to be sunk in said second member; the driving shaft for the film spool being hollow and housing an axially displaceable second shaft carrying on its outer end a knob provided with a peripheral groove and also housing a spring urging said second shaft in outward direction in order to telescopically lengthen said shaft of the film spool; means for locking said knob in sunk position and for releasing it to protruding position, by engaging and disengaging, respectively, said peripheral groove.

5. A roll-film camera as claimed in claim 2, in which the first actuating member forms a structural unit with the driving shaft for the film spool, has a smaller diameter than the second actuating member and has at its outer end a handle member adapted to occupy a sunk position and an erected position, is urged by a spring to erected position and provided with a slot and a recess in said slot; means for locking said handle member in sunk position and for releasing it to retractable erected position, upon engaging and disengaging, respectively, by manual displacement of said means, said recess.

6. A roll-film camera as claimed in claim 2, containing a sleeve or bushing surrounding the driving shaft for the film spool, said sleeve being connected with means for adjusting the objective and range-finder and carrying transmission members for the adjusting gears.

7. A roll-film camera as claimed in claim 2, in which the second actuating member has a smaller diameter than the first actuating member and is axially retractable from and displaceable in the first actuating member, to a sunk and a protruding position, respectively, relative to said first member.

8. Roll-film camera as claimed in claim 2, in which the first actuating member is coupled with a hollow driving shaft for the film spool; said shaft being rotatably housed in axially fixed position by a sleeve connected with the camera body; rotation of said first actuating member being transmitted to said shaft by means of an inner toothing of said first member, a pinion fastened to a flange of said sleeve and a cog wheel connected to said shaft; the second actuating member being connected with a central guide rod which is axially displaceable in and housed by said hollow shaft; said second member being adapted to be sunk in said first member, and provided with a rodlike member passing through said first member and engaging a control member for adjustment of objective and range-finder, said control member being rotatably arranged on said sleeve.

9. A roll-film camera as claimed in claim 2, comprising means for releasably locking the member adapted to be sunk, in rest position.

10. A roll-film camera as claimed in claim 2, comprising spring means for urging the member of smaller diameter to protruding position and locking means releasable by displacement, for holding said member in sunk position.

11. A roll-film camera as claimed in claim 2, comprising spring means for urging the member of smaller diameter to protruding position and locking means releasable by displacement, for holding said member in sunk position, said locking means being connected with an element slightly projecting beyond the surface of said member, for effecting displacement of the locking means.

References Cited in the file of this patent

UNITED STATES PATENTS

| | | |
|---|---|---|
| 2,495,355 | Stahl | Jan. 24, 1950 |
| 2,556,967 | Hineline | June 12, 1951 |